United States Patent Office.

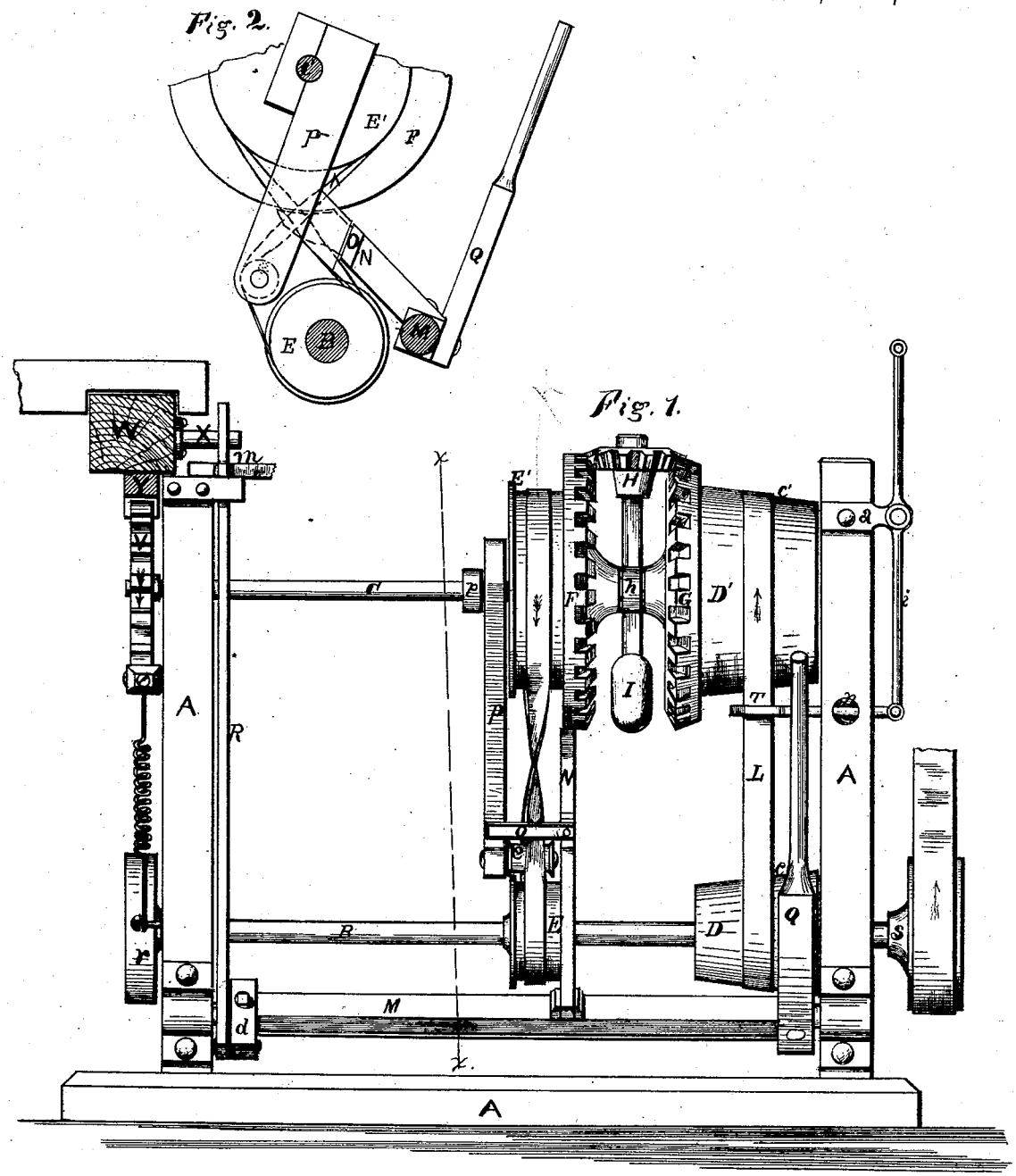

SPENCER HIATT, OF CLAYTON, INDIANA.

Letters Patent No. 111,539, dated February 7, 1871; antedated February 1, 1871.

IMPROVEMENT IN APPARATUS FOR TRANSMITTING POWER AND CHANGING THE SPEED.

The Schedule referred to in these Letters Patent and making part of the same.

I, SPENCER HIATT, of Clayton, in the county of Hendricks and State of Indiana, have invented a certain Differential Gearing, of which the following is a specification.

Nature and Objects of the Invention.

The invention consists in a system of (bevel) cog and belt-gearing, arranged in such a manner that the difference in speed of two concentric wheels revolving in opposite directions is available to rotate a third wheel and arm keyed to the center shaft, which it propels.

The object of this combination is to obtain a slow revolution of the central shaft in either direction, the speed being adjustable; also, by means of a tightening-pulley and brake, to start or stop the revolution of the shaft aforesaid, or to give it a quick reverse motion in one direction.

The movement is applicable to various feeding devices; also to obtain variable and reversible slow motion from fast, for various purposes.

Description of the Accompanying Drawing.

Figure 1 is an elevation of the device embodying my invention, and

Figure 2 is a transverse vertical section taken on line $x\ x$, fig. 1.

General Description.

A is the framing

B is the driving-shaft.

C is a shaft passing loosely through pulleys E′ and D′ and gear-wheels F and G $h$ is an arm keyed to the shaft C, between wheels F and G.

On this arm, as an axis, is the cog-wheel H. This can revolve freely on arm $h$.

The wheels F and G receive motion in the direction of the arrows, respectively, by means of the belts K and L, from pulleys E and D.

D and D′ are cone-pulleys in reverse order.

The belt K is crossed.

Corresponding points somewhere on the cones, as at $c\ c'$, have the same proportion to each other as the pulleys E and E′ have, or $c$ is to $c'$, as E is to E′.

When the belt L is on the points $c\ c'$, the wheels F and G have equal velocities in contrary directions, and the arm $h$ must remain stationary, because the points of contact of wheel H with the wheels F and G have an equal velocity.

As the belt L is shifted to the large part of the cone D′ and small part of cone D, the relative velocity of D′ and G is less, and when shifted in the contrary direction it is greater. Thus, while wheel F has a constant velocity, the wheel G may have a varying velocity, both above and below that of F.

The arm $h$ must rotate in the direction of the motion of the fastest moving wheel, with a speed equal to half the difference of velocity of gear-wheels F $e$ is a tightening-pulley, shown in dotted lines in fig. 2. It is on the arm or lever P. This is placed on the shaft C as a pivot or fulcrum, and confined by the collar $p$.

N is a brake, and

O is a cam on the rock-shaft M.

The cam O acts on the arm P, or a projection of it, to bring the tightening-pulley $e$ up to and tighten the belt K.

$a$ is a lever or handle for operating the rock-shaft M.

R is a catch-bar, operated by the rock-shaft M, through the arm $d$, for holding the tightening-pulley in position when belt K is in operation. It is held by a notch, as at $m$.

T is a sliding loop or belt-shifter, operated by the lever $i$, which is pivoted on a link, $a$.

$x$ is a coiled spring, to hold the shifter T in place.

I is a counter-weight on the arm $h$.

V is a cog (spur)wheel, to communicate the motion received from arm $h$ and shaft C. It is represented as meshing into the segment Y on a portion of a carriage, W.

The operation is as follows:

The tightening-pulley $e$ is brought up against the belt, as shown in fig. 2, by means of the lever Q. The belt may be held tight either by hand or by the catch-bar R.

It may be released by a pin or attachment, $x$, on the feeding-carriage, which is adjusted so as to throw the catch off at the proper point. This slacks the belt K, and the wheel F is propelled with the same speed as wheel G, through the wheel H, because of the resistance on the wheel V, and the shaft C ceases to revolve.

To revolve the shaft C in the opposite direction to that of the arrow on wheel V, with considerable velocity, let the lever Q be pulled back so as to bring the brake N up to the peripery of the wheel F with a force sufficient to retard or stop its motion. This will cause the arm $h$ to rotate in the same direction as the wheel G, so that the carriage W may thus be reversed with a quick continuous or a slower intermittent motion, and may be stopped at any point desired by releasing the brake.

Claims.

I claim as my invention—

1. The bevel-wheels F, G, and H, arm $h$, and shaft C, cone-pulleys D and D′, pulleys E and E′, and belts K and L, arranged and operated substantially as and for the purpose hereinbefore set forth 2. The lever Q, rock-shaft M, cam O, brake N, and catch-bar R, arranged and operated as and for the purpose hereinbefore set forth.

SPENCER HIATT.

Witnesses:
O. F. MAYHEW,
J. M. SURFACE.